(12) United States Patent
Figovsky

(10) Patent No.: US 6,303,683 B1
(45) Date of Patent: Oct. 16, 2001

(54) LIQUID EBONITE MIXTURES AND COATINGS AND CONCRETES FORMED THEREFROM

(75) Inventor: Oleg L. Figovsky, Haifa (IL)

(73) Assignee: Eurotech, Ltd., Fairfax, VA (US)

( * ) Notice: Subject to any disclaimer, the term of this patent is extended or adjusted under 35 U.S.C. 154(b) by 0 days.

(21) Appl. No.: 09/123,989

(22) Filed: Jul. 28, 1998

(51) Int. Cl.⁷ ....................................... C08K 3/40
(52) U.S. Cl. .................. 524/495; 524/418; 524/427; 524/496; 524/515
(58) Field of Search ..................... 524/408, 418, 524/477, 447, 493, 495, 496, 500, 511, 515

(56) References Cited

U.S. PATENT DOCUMENTS

| | | |
|---|---|---|
| 22,218 | 11/1858 | Mayall et al. . |
| 46,609 | 2/1865 | Simpson . |
| 48,992 | 7/1865 | Parmelee . |
| 48,993 | 7/1865 | Parmelee . |
| 76,293 | 3/1868 | Mullee . |
| 3,501,422 | 3/1970 | Nordisek et al. . |
| 3,653,423 | 4/1972 | Paddlock . |
| 3,802,898 * | 4/1974 | Laurent et al. ................. 106/280 |
| 4,066,599 | 1/1978 | Zimmerman . |
| 4,167,545 | 9/1979 | Fahrbach et al. . |
| 4,195,009 | 3/1980 | Zimmermann . |
| 4,444,330 | 4/1984 | Kasai et al. . |
| 4,550,142 | 10/1985 | Akita et al. . |
| 4,670,496 | 6/1987 | Kaniecki et al. . |
| 4,929,469 | 5/1990 | Kimura et al. . |
| 5,037,894 * | 8/1991 | Macleay et al. ............... 525/327.6 |
| 5,082,901 | 1/1992 | Linster . |
| 5,295,525 * | 3/1994 | Sanda, Jr. ........................ 152/503 |
| 5,534,574 * | 7/1996 | Sandstorm et al. ............. 524/262 |
| 5,580,919 | 12/1996 | Agostini et al. . |
| 5,717,022 * | 2/1998 | Beckmann et al. ............. 524/493 |
| 5,726,237 * | 3/1998 | Satoh et al. ..................... 524/495 |
| 5,766,687 | 6/1998 | Rappoport ....................... 427/386 |
| 5,798,416 | 8/1998 | Kamata et al. . |
| 5,861,454 * | 1/1999 | Ikeda et al. ..................... 524/495 |
| 5,886,086 | 3/1999 | Hubbell et al. . |
| 5,897,704 * | 4/1999 | Baglin ............................. 106/696 |

OTHER PUBLICATIONS

O Figovsky et al., Development of Polymer Concrete with Polybutadiene Matrix, Civil Engineering University, Voronezh, Russia, Mar. 28, 1996, pp. 437–444.

Ullmann's Encyclopedia of Industrial Chemistry, $5_{th}$ Edition, vol. A18, pp. 429–471, VCH Verlagsesellschaft, Weinheim 1991.

Oleg L. Figovsky et al., "Liquid Ebonite Mixtures for Anticorrosive Coverings" International Conference on Corrosion In Natural and Industrial Environments: Problems and Solutions, sponsored by NACE International Italia Section, Grado, Italy, 1995, pp. 593–596.

* cited by examiner

Primary Examiner—Edward J. Cain
Assistant Examiner—K. Lee Wyrozebski
(74) Attorney, Agent, or Firm—Pennie & Edmonds LLP

(57) ABSTRACT

The present invention relates to a synthetic rubber-based composition comprising:

- a low molecular weight rubber selected from polybutadiene comprising from about 75% to about 92% cis-1,4 units, a copolymer comprising butadiene units and from about 27 wt % to about 45 wt % pentadiene units, and mixtures thereof,
- a high molecular weight rubber comprising isobutylene units and not more than about 6 wt % isoprene units, the high molecular weight rubber being present in an amount of from about 0.5 parts to about 4 parts by weight based on the weight of low molecular weight rubber,
- sulfur,
- a vulcanization accelerator, and
- an active filler where the sulfur, the accelerator, and the active filler are each present in the form of a powder within a particular particle size range(s). Additionally, these compositions may be used to form coatings and rubber concretes. The invention also relates to methods of producing such compositions, coatings and rubber concretes.

42 Claims, No Drawings

US 6,303,683 B1

LIQUID EBONITE MIXTURES AND COATINGS AND CONCRETES FORMED THEREFROM

TECHNICAL FIELD

The present invention is related to liquid ebonite mixtures and, more specifically, to coatings and rubber concretes formed therefrom and to methods of producing such mixtures, coatings and concretes.

BACKGROUND OF THE INVENTION

Ebonite is the product of the vulcanization reaction of synthetic or natural rubber (high molecular weight cis-1,4-polyisoprene) with an excess of sulfur. Typically, the rubber vulcanization process takes place when 0.5–5 parts (by weight) of sulfur is combined under reactive conditions with 100 parts of rubber. A cross-linked network polymer structure results in which sulfur bridges link the polymeric natural rubber chains.

If vulcanization is allowed to continue until considerably more sulfur has combined with the natural rubber, a rigid, nonelastomeric plastic known as hard rubber or ebonite is formed. Ebonite is a hard, inextensible solid containing about 30–50% combined sulfur. Ebonite is long-known to the art, having been first made in the 1840s and produced on a commercial scale since about 1860, e.g., see U.S. Pat. Nos. 22,218, 46,609, 48,992, 48,993, 53,643 and 76,293.

Ebonite can be readily machined and is often produced in bar, tube or sheet stock for this purpose. Its main uses exploit its chemical inertness and corrosion resistance and its electrical and thermal insulating properties. However, the material softens at about 50° C., therefore, it is not suitable for high-temperature applications. Moreover, it is difficult, if not impossible, to apply sections of bar, tube or sheet ebonite stock to small parts or to parts with complicated shapes or profiles, for example, by gluing. Furthermore, it is difficult to form thin coatings from ebonite. Therefore, a rubber product with good chemical inertness and corrosion resistance and that is easily applied, e.g., by coating, onto such small and/or intricately shaped parts is highly desirable.

The present invention, a liquid ebonite mixture or LEM, satisfies these requirements. For the main rubber component, LEM comprises not a conventional solid rubber but a liquid rubber, which will be described in greater detail below. Liquid ebonite mixture, having excellent abrasion resistance and chemical resistance, is ideally suited for coatings, such as monolithic thick-layer coatings. LEM may be used to coat such small and/or intricately-shaped articles as (1) rotors of centrifuges for filtration processes and the working wheels of pumps and fans, (2) the inside surfaces of pipelines, fittings, etc. of small diameter, i.e., less than about 32 mm inner diameter, (3) perforated elements such as screens and mesh, (4) very intricate surface parts, e.g. membrane equipment and membrane hydrolysis apparatus, (5) chemical apparatus, reactor vessels and complex air ducts up to 500 mm in diameter, such as those with joining lips, and (6) galvanic or electrolysis baths and their components. Coating with LEM eliminates the need for an additional glue layer and provides adhesion strength to steel up to 11 MPa in tear-apart tests.

U.S. Pat. No. 4,195,009 discloses coating systems comprising liquid rubber. However, the liquid rubber must be present in the form of hydroxy-terminated rubber, e.g., hydroxy-terminated polybutadiene, which is then reacted with a polyether triol and an isocyanate component in the presence of a mercury catalyst, carbon black, a low oil absorbency silica and a suspending agent therefore, lecithin, and a molecular sieve desiccant. U.S. Pat. No. 4,929,469 discloses a UV-curable surface protective coating comprising a liquid diene rubber of molecular weight from 1,000 to 10,000 and having one or more hydroxyl groups. Additionally, a diisocyanate component, a diol, and an ethylenically unsaturated monomer having at least one hydroxy group must be present and the composition is then screen printed and cured by UV radiation to form a coating which is easily peeled off of a printed circuit board after plating and soldering. Therefore, the coating systems disclosed in these references are based on polyurethane chemistry and not rubber vulcanization.

The highly chemically resistant rubber covering disclosed herein is provided by adding at least one powdered substance, sometimes known as an active filler, to the liquid rubber thereby creating a two phase structure or a composite. The phase comprising the filler is believed to be transformed into a new phase as a result of the interaction of the filler with an aggressive medium, such as water, aqueous acid or aqueous alkali, which penetrates the LEM rubber comprising the filler. This new filler phase is believed to comprise a high strength hydrate complex, as will be discussed in detail below. As aggressive medium penetration causes, e.g., hydrate complex formation, the volume of the filler becomes greater than the volume of the initial filler. As a result of filler particle volume growth, the free volume of the composite decreases.

Moreover, in order to further improve the properties and decrease cost, thereby expanding the range of use of these composites, organic and inorganic fillers and aggregates may also be incorporated into the LEM compositions of the invention.

Furthermore, the LEM compositions of the present invention are ideally suited for use as binders, such as are employed in pharmaceutical formulations and in rubber concrete. The conventional binders used in polymer concrete are unsaturated polyesters, epoxy resins and, to some extent, furan and acrylic resins. However, the future use of unsaturated polyesters, which comprise volatile styrene monomer, is likely to be strongly restricted by laws limiting styrene emissions. Furthermore, high strength epoxy resin-based polymer concretes are very costly, therefore, their use is limited to relatively cost-insensitive applications such as cavitation resistant materials for offshore structures, monolithic flooring and to applications in the machine-tool making industry.

Therefore, advanced rubber concretes comprising the liquid ebonite mixtures of the present invention as binders are very useful because they avoid these disadvantages of the polymers conventionally used in concrete formulations. Moreover, hydrolysis resistant LEM binders make possible the preparation of rubber concretes with high acid and alkali resistance, good toughness and excellent adhesion to the steel reinforcement typically found in reinforced structural concrete.

SUMMARY OF THE INVENTION

One embodiment of the present invention relates to a solventless synthetic rubber-based composition comprising:
  a low molecular weight rubber selected from polybutadiene comprising from about 75% to about 92% cis-1,4 units, a copolymer comprising butadiene units and from about 27 wt % to about 45 wt % pentadiene units, and mixtures thereof,
  a high molecular weight rubber comprising isobutylene units and not more than about 6 wt % isoprene units, the high molecular weight rubber being present in an amount of from about 0.5 parts to about 4 parts by weight based on the weight of low molecular weight rubber, sulfur, a vulcanization accelerator, and an active filler where the sulfur, the accelerator, and the active filler are each present in the form of a powder with a particle size of from about 5 µm to about 85 µm.

Preferably, from about 20 parts to about 50 parts by weight of sulfur, from about 2.5 parts to about 30 parts by weight of the accelerator, and from about 14 parts to about 30 parts by weight of the active filler is present, each per 100 parts by weight of low molecular weight rubber. Preferably each of the sulfur, the accelerator, and the active filler is present in the form of a powder with a particle size of from about 15 µm to about 75 µm and, more preferably, each is present in the form of a powder with a particle size of from about 15 µm to about 50 µm. If desired, the composition may include at least one activator.

The composition may be vulcanized at a vulcanization temperature of greater than or equal to about 80° C. Preferably, the heating-up to the vulcanization temperature and cooling-down from the vulcanization temperature is conducted at a rate of not more than about 1° C. per minute.

Another embodiment of the present invention relates to a coating for a substrate, where the coating is formed of the above-described composition. Preferably, the coated substrate is carbon steel, stainless steel, aluminum, aluminum alloys, glass, wood, titanium, titanium alloys, concrete, reinforced concrete, plastic, or a reinforced plastic.

The coating may be vulcanized at a vulcanization temperature of greater than or equal to about 80° C. Preferably, the heating-up to the vulcanization temperature and cooling-down from the vulcanization temperature is conducted at a rate of not more than about 1° C. per minute. Preferably, the vulcanized coating has a thickness of from about 0.3 mm to about 4.5 mm.

An additional embodiment of the present invention relates to a rubber concrete composition comprising:

a low molecular weight rubber selected from polybutadiene comprising from about 75% to about 92% cis-1,4 units, a copolymer comprising butadiene units and from about 27 wt % to about 45 wt % pentadiene units, and mixtures thereof, a high molecular weight rubber comprising isobutylene units and not more than about 6 wt % isoprene units, the high molecular weight rubber being present in an amount of from about 0.5 parts to about 4 parts by weight based on the weight of low molecular weight rubber, sulfur, a vulcanization accelerator, an active filler, and a fine aggregate wherein the sulfur and the accelerator are each present in the form of a powder with a particle size of from about 5 µm to about 85 µm and wherein the active filler is present in the form of a powder and consists essentially of at least one first active filler with a particle size of from about 5 µm to 85 µm and at least one second active filler with a particle size of from greater than 85 µm to about 120 µm.

The active filler of the rubber concrete may be selected from carbon black, silica, titanium dioxide, bismuth oxide, fly ash, and mixtures thereof. Preferably, the first active filler is fly ash and the second active filler is fly ash.

Generally, from about 6 parts to about 15 parts by weight of the first active filler and from about 10 parts to about 30 parts by weight of the second active filler are present per 100 parts by weight of low molecular weight rubber. Typically, from about 25 wt. % to about 60 wt. % of the active filler is present as the first active filler and from about 75 wt. % to about 40 wt. % of the active filler is present as the second active filler.

Preferably, the fine aggregate consists essentially of sand with a particle size of from about 0.14 mm to and including 5 mm. The rubber concrete may also include at least one coarse aggregate. Preferably, the coarse aggregate is selected from gravel and mineral chips and has a grain size of from greater than 5 mm to about 70 mm.

DETAILED DESCRIPTION OF THE INVENTION

The LEM compositions of the present invention are based upon a liquid rubber material. Such liquid rubbers may be hardened or cured through reaction of their double bonds initiated by curing agents such as sulfur or peroxides, including redox systems. The curing agent may also comprise vulcanizing agents, accelerators, vulcanization activators and special additives. The principal curing agent is elemental sulfur. Vulcanizates obtained using sulfur, because of the presence of polysulfide bonds, are characterized by their high strength, endurance under repeated deformation and good aging resistance.

Curing accelerators are used for increasing the velocity of chemical reactions between sulfur and the rubber and for decreasing the vulcanization temperature. For example, an acceptable curing velocity is reached using the accelerator combination of TIURAM-D and TSIMAT. To increase the effectiveness of the accelerator, inorganic and organic activators may also be included in the formulation. In particular, zinc oxide may be used as an activator. Special additives such as plasticizers (for decreasing the mixture viscosity and/or internal stress and increasing the strength and impact load), anti-oxidants and absorbents may also be introduced into the matrix composition.

Unlike conventional ebonite, which is based on natural rubber, i.e., high molecular weight, substantially cis-1,4-polyisoprene, the liquid rubber of the present invention is formed from polybutadiene comprising from about 75% to about 92% cis-1,4 units or a copolymer comprising butadiene units and from about 27 wt % to about 45 wt % pentadiene units. The amount of cis-1,4-polybutadiene units present in such copolymers is not critical to the success of the invention. If desired, mixtures of these liquid polymers and/or copolymers may also be used.

The molecular weight of the liquid rubber component must be low enough such that the rubber is a liquid at 20° C. Therefore, this component is also referred to herein as the low molecular weight rubber component. Preferably, the number average molecular weight of the low molecular weight liquid rubber is from about 2,000 g/mol to about 30,000 g/mol. The liquid rubber typically has a Brookfield viscosity of from about 0.7 Pa.s to about 300 Pa.s at 20° C. Preferably, the liquid rubber has a Brookfield viscosity of from about 1.0 Pa.s to about 30.0 Pa.s at 20° C.

Suitable commercially available liquid rubber materials which may be used in the LEM compositions of the present invention include but are not limited to the low molecular weight polybutadiene resins RICON® 130, 131, 181 and 184, available from Ricon Resins, Inc. (Grand Junction, Colo.); POLYOIL® 110 and 130, available from Creanova/Hüls (Germany); NMPB, SKDNN mark 1, SKDNN 25, SKDNN 30 and SKDNN 35, available from Efremov-Kautschuk GmbH (Frankfurt, Germany); and PB—N available from the Voronezh NIISK Plant (Voronezh, Russia). Suitable commercially available liquid rubber materials additionally include the butadiene/pentadiene copolymers SKDPN 8, SKDPN 12 and SKDPN 14 available from the Yaroslav Synthetic Rubber Plant (Yaroslav, Russia).

Preferable commercially available liquid rubber materials which may be used include the low molecular weight polybutadiene resins PB—N, NMPB, SKDNN mark 1, SKDNN 25, SKDNN 30 and SKDNN 35 and the butadiene/pentadiene copolymers SKDPN 8, SKDPN 12, and SKDPN 14.

High molecular weight butyl rubber is also present in the LEM compositions of the present invention. As is well known to those of ordinary skill in the art, the synthetic rubber commonly known as butyl rubber is a copolymer. The majority of the monomer units are isobutylene, which contains no carbon-carbon double bond. Therefore, a small amount of isoprene comonomer is always present in commercially available butyl rubbers to impart vulcanizability to the material. As used herein, butyl rubber, isobutylene-isoprene rubber and a copolymer of isobutylene and isoprene are synonymous. Since the amount of comonomer is small, the properties of the copolymer are similar to those of homopolyisobutylene. Preferably, the butyl rubber of the invention comprises isobutylene units and not more than about 6 wt % isoprene units. Without limitation to any particular theory, the high molecular weight butyl rubber is believed to impart good strength to the LEM compositions of the invention.

The butyl rubber is generally dissolved in the liquid rubber, as will be discussed in detail below. Typically, from about 0.5 parts to about 4 parts by weight of butyl rubber are present in the LEM, based on the weight of low molecular weight rubber. Preferably, from about 0.6 parts to about 2.8 parts by weight of butyl rubber are present in the LEM. If less than about 0.5 parts of butyl rubber are present, the butyl rubber is believed to have little effect upon the properties of the LEM composition. If more than about 4 parts of butyl rubber are present, the butyl rubber is believed impart too high a viscosity to the LEM composition for it to flow effectively.

The molecular weight of the butyl rubber component must be high enough such that the rubber is not liquid at 20° C. Therefore, this component is also referred to herein as the high molecular weight rubber component. The number average molecular weight of the butyl rubber component of the present invention is not critical provided that it is at least about 50,000 g/mol. There is no upper limit for useful butyl rubbers as long as the butyl rubber comprises a substantially linear polymer chain. The number average molecular weight of the high molecular weight butyl rubber is preferably from about 75,000 to about 450,000 g/mol. The butyl rubber typically has a Mooney viscosity of from about 35 to about 55 at 125° C. Preferably, the butyl rubber has a Mooney viscosity of from about 41 to about 47 at 125° C.

Although it is not necessary for the success of the present invention, if desired, the butyl rubber may optionally comprise functional groups, such hydroxy, epoxy or halogen, e.g., chlorine and bromine. Typically, such groups are present as pendant side groups attached to the main polymer chain and/or as end-groups.

Suitable commercially available butyl rubber materials which may be used in the LEM compositions of the present invention include but are not limited to the butyl rubbers Butyl 165, 268, 365, 1065 and 1077 (available from Exxon Chemical), Butyl 100, 101-3, 200, 301, 302 and 402 (Polysar), and BK 1675N (Kautschuk-Gesellshaft GmbH, Germany); the chlorinated butyl rubbers Chlorobutyl 1065, 1066, and 1068 (Exxon Chemical) and Chlorobutyl 1240 and 1255 (Polysar); and the brominated butyl rubbers Bromobutyl 2222, 2233, 2244 and 2255 (Exxon Chemical) and Bromobutyl 2030 and X2 (Polysar).

Preferable commercially available butyl rubber materials which may be used include Butyl 165 (Exxon Chemical), Butyl 101-3 (Polysar), BK 1675N (Kautschuk-Gesellshaft) and BK (Lab. N 34/75) and BK (Lab. N 41/450) (Efremov SKP, Central Laboratory, Efremov, Russia).

As is well known to those skilled in the rubber vulcanization art, sulfur may be used to vulcanize or cross-link polymeric chains containing carbon-carbon double bonds, e.g., rubbers such as polybutadiene and a copolymers of isobutylene and isoprene. For example, the vulcanization of rubber with sulfur is discussed in detail in U.S. Pat. Nos. 3,653,423 and 5,580,919.

To form the highly cross-linked ebonite-like compositions of the present invention, a larger amount of sulfur is generally present than is used to form so-called soft-cured rubbers, where only about 10 parts sulfur per 100 parts of rubber are used. Generally, from about 20 parts to about 50 parts by weight of sulfur is present per 100 parts by weight of low molecular weight rubber. Preferably, from about 25 parts to about 50 parts by weight of sulfur is present per 100 parts by weight of low molecular weight rubber and, more preferably, from about 27 to about 35 parts by weight of sulfur is present.

Suitable commercially available sulfur which may be used in the LEM compositions of the present invention includes but is not limited to AKROCHEM SULFUR (available from Akrochem Corp.); CODE 104 RUBBERMAKER'S, CODE 209 OIL TREATED RM SULFUR and CODE 338 SUPERFINE RM SULFUR (Harwick Chemical Corp.); CRYSTEX HS INSOLUBLE SULFUR and CRYSTEX 90 OT-20 INSOLUBLE SULFUR (Akzo Chemicals, Inc.); DEVIL AA SULFUR and MULE BRAND SULFUR (C. P. Hall, Co.); and RUBBER MARKETS SULFUR and SPIDER BRAND SULFUR (Taber, Inc.). Preferably, the following commercially available sulfur is used in the LEM compositions of the present invention: AKROCHEM SULFUR, CODE 104 RUBBERMAKER'S, CODE 338 SUPERFINE RM SULFUR, MULE BRAND SULFUR, and SPIDER BRAND SULFUR.

It is not desirable to use peroxides for vulcanizing the LEM compositions of the invention. This is thought to be so because the amount of cross-linking imparted by peroxides is believed to be insufficient as compared to the amount of cross-linking that is achievable with sulfur and sulfur-based systems, e.g., those comprising sulfur and at least one vulcanization accelerator and/or activator.

As is well known to those skilled in the rubber vulcanization art, accelerators may be used along with sulfur in rubber vulcanization to increase and/or regulate the rate of vulcanization. Therefore, at least one accelerator is also present in the LEM. Generally, from about 2.5 parts to about 30 parts by weight of the accelerator is present per 100 parts by weight of low molecular weight rubber. Preferably, from about 3.0 parts to about 25 parts by weight of the accelerator is present per 100 parts by weight of low molecular weight rubber and, more preferably, from about 3.5 parts to about 22 parts by weight of accelerator is present.

Suitable commercially available accelerators which may be used in the LEM compositions of the present invention include but are not limited to aldehyde amines, e.g., hexamethylene tetraamine (HMT) and ethylidene aniline (EA); guanidines, e.g., diphenyl guanidine (DPG), triphenyl guanidine (TPG) and di-o-tolylguanidine (DOTG); thiazoles, e.g., mercaptobenzthiazole (MBT), the sodium salt of MBT and dibenzthiazyl disulfide (MBTS); sulfenamides, e.g., N-cyclohexylbenzthiazylsulfenamide (CBS) and N-oxydiethylbenzthiazylsulfenamide (NOBS); dithiocarbamates, e.g., piperidine pentamethylenedithiocarbamate (PPD), zinc diethyldithiocarbamate (ZDC, ZDEC), sodium diethyldithiocarbamate (SDC) and zinc ethylphenyldithiocarbamate; thiuram sulfides, e.g., tetramethylthiuram disulfide (TMT, TMTD), tetraethylthiuram disulfide (TET, TETD), tetramethylthiuram monosulfide (TMTM) and dipentamethylenethiuram tetrasulfide (DPTS); xanthates, e.g., zinc isopropyl xanthate (ZIX), sodium isopropyl xanthate (SIX) and zinc butyl xanthate (ZBX); and morpholine disulfides, e.g., bis-morpholine disulfide.

Preferably, at least one of the following commercially available accelerators are used in the LEM compositions of the present invention: 2-mercaptobenzothiazole (available as Akrochem MBT from Akrochem Co.; CAPTAX, T. R. Vanderbilt Company Inc.; CAPTAX, Elastochem, Inc.; THIFAX (MBT), Elastochem, Inc.; EKALAND MBT, Sovereign Chemical Co.; MBT, Uniroyal Chemical Company Inc.; PERKACIT MBT, Akzo Chemicals (Netherlands); and VULCACIT MERCAPTO, Bayer AG (Germany)), zinc 2-mercaptobenzothiazolate (available as EKALAND ZMBT from Sovereign Chemical Co.), zinc dimethyldithiocarbamate (available as Akrochem MZ from Akrochem Co.; METHYL CUMATE, T. R. Vanderbilt Company Inc.; and METHYL ZIMATE, Elastochem, Inc.), zinc dimethylthiocarbamate (available as METHASAN from Harwick Chemical Corp.), N,N-dimethylcyclohexylammonium dibutyldithiocarbamate (available as Akrochem Accelerators EZ from Akrochem Co.), tetramethylthiuram disulfide (available as Akrochem TMTD, Akrochem Co; TUEX, Uniroyal Chemical Company Inc.; and PERKACIT DPG, Akzo Chemicals), tetraethylthiuram disulfide (available as Akrochem TETD from Akrochem Co.), a mixture of tetramethylthiuram disulfide and tetraethylthiuram disulfide (available as THIURAM ME from Arrow Polychem, Inc.), tetrabutylthiuram disulfide (available as BUTYL TUADS DLC-A and ROFAX from T. R. Vanderbilt Company Inc.), benzothiazyl disulfide (available as MBTS from Uniroyal Chemical Company Inc. and Akrochem MBTS from Akrochem Co.), tetramethylthiuram monosulfide (available as Akrochem TMTM from Akrochem Co. and PERKACIT TMTM(G) from Akzo Chemicals), tetracarbonyl sulfenamide (available as Akrochem Cure-Rite 18 from Akrochem Co.; CURE-RITE 18, T. R. Vanderbilt Company Inc.; and CURE-RITE 18, Elastochem, Inc.), 4,4'-dithiomorpholine (available as EKALAND DTDM from Sovereign Chemical Co. and Akrochem Accelerators "R" from Akrochem Co.), 2-benzothiazyl-N-morpholine disulfide (available as Akrochem Accelerators MF from Akrochem Co.), N,N-diphenyl morpholine (available as Akrochem Accelerators THIO NO. 1 from Akrochem Co.), diphenylguanidine (available as DPG Vulcanization Accelerator from Monsanto and EKALAND DPG from Sovereign Chemical Co.), dipentamethyl thiourea (available as Akrochem DPTT from Akrochem Co.), magnesium oxide (available as MAGCHEM 125 from Martin Marietta; ELASTOMAG 170 Powder, Morton International; STARMAG CX-50 and CX-150, Merrand International Co.; and MAGLITE D, Marine Magnesium), and zinc oxide (available as Grade 318 and 185 American Process from Eagle Zinc Co.).

In the present invention, the matrix of a composite material comprises the rubbers and all the other compounds assisting with their vulcanization, these materials being characterized in detail above. Composites are generally described as a macroscopic combination of two or more components. One of the components of the composite is typically a fiber or a particulate, although fibers and particulates may both be present, and is used to reinforce the composite; therefore, this component is referred to herein as the reinforcement. The other component of the composite typically surrounds the fiber or particulate and is generally referred to as the matrix. In the composites of the present invention, the reinforcement comprises at least one active filler.

The highly chemically resistant rubber covering disclosed herein is provided by adding at least one reinforcement comprising a reactive powdered substance, also known as an active filler, to the liquid rubber thereby creating a two phase composite structure. Such a structure is also known as a particulate reinforced composite, where the particulate comprises the active filler and the matrix comprises the low molecular weight rubber and high molecular weight rubber.

Without limitation to any particular theory, it is believed that, as the active filler interacts with water or with another aggressive medium diffusing into the composite, hydrate complexes, also known as crystal-hydrates, form in the defects, e.g., micropores and/or microcracks, of the formulation. This process acts to "repair" these defects and thereby to increase the strength of the composite. Additionally, active fillers are thought to function as barriers which inhibit the further penetration of aggressive media. Moreover, as the crystal-hydrates are formed, the volume and the specific surface area of the active filler increases. As a direct result of the increased specific surface area of the active filler, the adhesion between the reinforcement and the rubber is believed to become even stronger.

The active filler reinforcement is believed to be transformed to a new phase comprising a high strength hydrate complex as a result of the interaction of the filler with an aggressive medium, such as water, aqueous acid or aqueous alkali, penetrating the composite comprising the filler. The volume of the active filler becomes greater than the volume of the initial filler as aggressive medium penetration causes hydrate complex formation. As a result of active filler particle volume growth, the free volume of the composite decreases.

In practice, exposure to, e.g., aqueous solutions of chlorine or nitric acid, during the filler's conversion leads to formation of a high strength protective layer with a low diffusion coefficient. This protective layer provides a barrier to further water and aggressive media penetration.

Typical active fillers include but are not limited to carbon black, silica, titanium dioxide, bismuth oxide, fly ash, and mixtures thereof. Generally, from about 14 parts to about 30 parts by weight of active filler is present per 100 parts by weight of low molecular weight rubber. Preferably, from about 16 parts to about 26 parts by weight of active filler is present per 100 parts by weight of low molecular weight rubber and, more preferably, from about 18 parts to about 23 parts by weight of active filler is present.

Suitable commercially available carbon black active fillers which may be used in the LEM compositions of the present invention include but are not limited to A-BLACK, Polymer Valley Chemicals; N110, N135, N231, Sid Richardson; HUBER S-212, N231, N234, S-315, N330, N650, N660, ARO-60(N754), N990, N762, J. M. Huber; and FURNEX N-754, N-762, N-787, Columbian Chemicals. Suitable commercially available non-carbon black active fillers which may be used in the LEM compositions of the present invention include but are not limited to #8-C Calcined Clay, Harwick Chemical Corp.; AKROCHEM EW 150 clay, HC 100 Clay, Akrochem Co.; BARCO B, Barium & Chemicals, Inc.; bismuth oxide, Merck GmbH, Germany; HI-SI ABS, 233, SILENE 732D, 532EP, PPG Industries; POLARLINK 15R, 45R, PV-S 45, Polymer Valley Chemicals; TIEBRIGHT, Malvern Minerals; ULTRASIL VN 3 SP, Degussa GmbH, Germany; and UNITANE titanium dioxide, Kemira AY, Finland.

Preferably, the following commercially available active fillers are used in the LEM compositions of the present invention: ARQ-60(N754) and Huber N762 carbon black, J. M. Huber; FURNEX N663 and N-762 carbon black, Columbian Chemicals; bismuth oxide, Merck GmbH, Germany; SILENE 732D and 532EP silica, PPG Industries; ULTRASIL VN3 SP silica, Degussa GmbH, and UNITANE titanium dioxide, Kemira AY.

It is critical to the success of the LEM compositions of the present invention that the sulfur, the at least one active filler, and the accelerator or accelerators are each present in the form of an ultradispersive powder. Without limitation to any particular theory, such powders are believed to be required for the successful implementation of the invention by promoting a homogeneous vulcanization reaction and/or a homogeneous distribution of active filler throughout the LEM composition.

Generally, with the exception of rubber concretes comprising LEMs which will be discussed in detail below, the sulfur and each active filler and accelerator present has a mean particle size of from about 5 $\mu$m to about 85 $\mu$m. Preferably, the sulfur and each active filler and accelerator present has a mean particle size of from about 15 $\mu$m to about 75 $\mu$m. More preferably, the sulfur and each active filler and accelerator present has a mean particle size of from about 15 $\mu$m to about 50 $\mu$m. The mean particle size is determined by methods well known to those with ordinary skill in the art, for example, by optical microscopy. When the particles are substantially spherical, the mean particle size is equivalent to the mean particle diameter. Technical products, many of which have broad particle size distributions, can be sieved by methods well known to those in the art to narrow their distribution such that it falls within the desirable limits as set forth above.

Although not a required component in the LEM-containing materials of the present invention, activators may be incorporated into the LEM to modify the rate of vulcanization, as is well known to those of ordinary skill in the vulcanization arts. Generally, from about 0.5 parts to about 4.3 parts by weight of the activator is present per 100 parts by weight of low molecular weight rubber. Preferably, from about 1.0 parts to about 3.0 parts by weight of the activator is present per 100 parts by weight of low molecular weight rubber and, more preferably, from about 1.4 parts to about 2.2 parts by weight of activator is present.

Suitable commercially available activators which may be used in the LEM compositions of the present invention include but are not limited to CALCIUM HYDROXIDE HP, C. P. Hall; D-B-A, Uniroyal Chemical; ELASTOMAG 170 Powder, Morton International; HYSTENE 3022, 5016, 9512, INDUSTENE M, 105, 4516, 9018, Hunko Chemical; NATRO CEL 5050-A and 35, Natrochem; RED LEAD #97, Akrochem; STARMAG CX-50, CX-150 and U, Merrand International Co.; LUPERCO 101-XL, 130-XL, 331-XL, AST, ATC, 231, NATRO CEL TATM, 5050 and STAN MAG 112, Harwick Chemical Co.; STRUCTOL FA 541, ZEH-DL and SYNPRO-WARAE R-11, Structol Co. of America; and ZINOX—GRADE 350, American Chemet.

Preferable commercially available activators which may be used in the LEM compositions of the present invention include but are not limited to a dibenzylaminemonobenzylamine blend (available as D-B-A from Uniroyal Chemical), 2,5-dimethyl-2,5-di(t-butylperoxy)hexane-3 on an inert filler (available as LUPERSOL 130-XL from Harwick Chemical Co.), triallyl trimellitate-silicate blend (available as NATRO CEL TATM from Harwick Chemical Co.), a mixture of zinc salts of aliphatic and aromatic carboxylic acids bound to active inorganic filler (available as STRUCTOL FA 541 from Structol), magnesium oxide (available as MAGCHEM 125 from Martin Marietta; ELASTOMAG 170 Powder, Morton International; STARMAG CX-50 and CX-150, Merrand International Co.; and MAGLITE D, Marine Magnesium), $Pb_2O_3$ (available as RED LEAD #97 from Akrochem) and mixtures thereof.

Any or all of the following optional additional materials may be present in the compositions of the invention, if desired:

antioxidants, antiozonants, inhibitors, UV light absorbers and heat sensitizers;

antiblocking agents, antiflex-cracking agents, antislip agents, antistatic agents and flame retarders;

chemical and heat stabilizers;

fungicides and germicides;

processing aids such as homogenizing agents, peptizers, plasticizers, softeners, dispersing agents and tackifiers; and solvents.

Preferably, when any of the above-mentioned additional materials are present, each is present at from about 0.02 parts to about 3.8 parts by weight per 100 parts by weight of low molecular weight rubber and, more preferably, each is present at from about 0.03 to about 3.2 parts by weight.

If desired, the LEM can also comprise further optional components, examples being pigments, dyes, microspheres, reinforcing agents, for example fibers in the form of filaments, staple, mats, etc., thixotropic agents, coupling agents, catalysts and/or leveling agents. Examples of possible components are those described in Ullmann's Encyclopedia of Industrial Chemistry, 5th Edition, Vol. A18, pp. 429–471, VCH Verlagsgesellschaft, Weinheim 1991 which is incorporated herein by reference.

Suitable commercially available additional materials which may be used in the LEM compositions of the present invention includes but is not limited to AKROCHEM ANTIOXIDANT 33, 36, 58, 60, NIBUD, PEPTIZER 9344, PTP and AKSOSORB, Akrochem; CHIMASSORB 944 FL and TINUVIN 622 LD, Ciba-Geigy AG, Switzerland; STABLWHITE POWDER (49-454), SUPRMIX PEPTIZER 966, 7010, SUPRMIX PLASTHALL 4141 and 226, C. P. Hall; TOPANOL 205, CA and CA-SF, Zeneca Stabilizers; ULTRANOX 236, 257 and 626, GE Specialty Chemicals; SUBLIMED BLUE LEAD, Eagle-Picher; MARK TT, WS and XI, Argus Chemical; and GUM 150, NATRO-CEL 97-A, 1312-DLC-A, BCA, LM and PLASTONE 20 A, Harwick Chemical Co.

The following non-limiting method is suitable for forming the LEM compositions of the invention. However, certain modifications in conditions, apparatus, etc. may be undertaken without departing from the scope and spirit of the present invention, as those of ordinary skill in the art will recognize. A copolymer of isobutylene and isoprene, generally present in the form of small size chunks (from about 5 mm to about 8 mm on a side) is dissolved in linear or copolymer polybutadiene liquid rubber for from about 2 hours to about 3 hours at a temperature of from about 20° C. to about 35° C. The butyl rubber may be swollen with a solvent, typically an aliphatic hydrocarbon, to speed its dissolution in the liquid rubber. It is preferred that this rubber solution is then mixed with sulfur, present in a pulverulent form (particle size from about 25 $\mu$m to about 65 $\mu$m), in a mixer suitable for use with low viscosity liquids at a rotation speed of from about 25 rpm to about 45 rpm for from about 20 minutes to about 40 minutes at from about 15° C. to about 40° C. After such mixing, the other components of the composition, e.g., filler(s), accelerator(s), are added and the batch is then mixed an additional period of from about 15 minutes to about 25 minutes at from about 15° C. to about 40° C. Mixing is followed by grinding in an appropriate disk or roll color mill, e.g., a paint rolling grinder, for a period of from about 18 minutes to about 25 minutes at from about 15° C. to about 30° C. Such compositions may be vulcanized, e.g., under the conditions described in detail below for the vulcanization of coatings comprising LEM. For example, such compositions are typically vulcanized at a temperature of from about 80° C. to about 150° C., preferably from about 110° C. to about 125° C., for from about 6 hours to about 20 hours, preferably from about 8 hours to about 12 hours, by using only dry hot air at a pressure not more than about 4.5 atm, preferably from about 0.5 atm to about 3.7 atm.

In another embodiment of the present invention, a protective coating comprising LEM is formed on a substrate. Preferably, the coating on the substrate comprises a vulcanized LEM. A wide variety of substrates may be coated with the LEM formulations of the present invention. Suitable substrates include but are not limited to carbon steel, stainless steel, aluminum and aluminum alloys, glass, wood, titanium and titanium alloys, concrete, including reinforced concrete, and plastic, including reinforced plastic. Preferably, the substrates coated with the LEM formulations of the present invention include carbon steel, stainless steel, reinforced concrete and aluminum alloys. More preferably, the substrates coated with the LEM formulations of the present invention include carbon steel and aluminum alloys.

Liquid ebonite compositions may be coated onto a substrate, e.g., a cleaned steel plate. The coating is prepared as previously described. Typically, the coating layer is applied such that the vulcanized coating has a thickness of from about 0.3 mm to about 4.5 mm. Preferably, the vulcanized coating has a thickness of from about 0.5 mm to about 3.0 mm and, more preferably, from about 0.7 mm to about 2.2 mm.

Then, the coating is vulcanized at a temperature of from about 80° C. to about 150° C., preferably from about 110° C. to about 125° C., for from about 6 hours to about 20 hours, preferably from about 8 hours to about 12 hours, by using only dry hot air at a pressure not more than about 4.5 atm, preferably from about 0.5 atm to about 3.7 atm. As is well known to those of ordinary skill in the vulcanization art, the temperature and time of vulcanization are inversely related, i.e., higher vulcanization temperatures generally require shorter vulcanization times and vice versa. For example, at 150° C., a vulcanization time of about 6 hours is usually sufficient to substantially vulcanize the compositions of the invention. However, at 125° C., the vulcanization time is generally longer, typically about 15 hrs. At even lower vulcanization temperatures, e.g., 110° C., about 20 hrs may be required for vulcanization. Moreover, the presence of accelerators, activators and other additives also influence the time and/or temperature required for vulcanization. Therefore, the above-described conditions for vulcanization may be adjusted appropriately for the particular mixture being vulcanized as is well known to those skilled in the vulcanization art.

As is also applicable to LEM compositions, the heating-up of a coating comprising LEM to the vulcanization temperature and cooling-down from the vulcanization temperature should be conducted at a rate of not more than about 1° C. per minute. If the rate is greater than about 1° C. per minute the coated film may develop undesirable surface defects, for example, pores may open in the film surface.

Considering that, in practice, vulcanization is not always performed at high temperatures, suitable additive combinations may be used to give satisfactory vulcanization at relatively lower temperatures. For example, an acceptable vulcanization velocity may be reached with a combination of TIURAM-D and TSIMAT accelerators and with zinc oxide as an activator. An exemplary formulation comprises 2 parts of TIURAM-D, 2 parts TSIMAT, and 20 parts zinc oxide, all per 100 parts by weight of low molecular weight rubber.

In an additional embodiment, a rubber binder or a rubber concrete is formed from a LEM composition of the present invention. Such LEM compositions, containing rubber having the consistency of a viscous liquid, open up the possibility of processing rubber binder or rubber concrete compositions by the method of free molding, i.e., molding which occurs without the need for high pressures.

For the purposes of this application, rubber concrete compositions comprising liquid rubber are separated into the following groups based on the type of inclusions present in the matrix:

(1) rubber matrix, which comprises the rubbers and all the other components assisting with their vulcanization;

(2) rubber binder, which comprises the rubber matrix and which further comprises at least one finely dispersed filler, i.e., the active filler; and (3) rubber concrete, which comprises the rubber binder and added aggregate or aggregates, which are much coarser than the finely dispersed filler.

Certain combinations of these groups provide a basis for production of rubber mastics and fine and coarse grained rubber concrete.

It is particularly desirable to use the compressive strength of cube samples 4 cm long on each side as a criterion to optimize the rubber matrix composition in such applications. Furthermore, carrying out experiments according to a statistically designed plan makes it possible to optimize the composition with required accuracy and to considerably reduce the number of experiments required as compared to traditional methods of 'passive' experimentation. For example, optimization of the rubber matrix composition has been carried out according to the Kifer-Jonson method.

Generally, for a rubber binder comprising LEM, each particulate component, e.g., the sulfur and each accelerator present, has a mean particle size as previously specified, i.e., generally from about 5 $\mu$m to about 85 $\mu$m, preferably from about 15 $\mu$m to about 75 $\mu$m and, more preferably, from about 15 $\mu$m to about 50 $\mu$m. However, each active filler present in a rubber concrete formulation may generally have a somewhat larger mean particle size range, from about 5 $\mu$m to about 120 $\mu$m. Preferably, two or more active fillers are present. The first active filler has a particle size range of from about 5 μm to 85 μm. Preferably, the first active filler has a particle size range of from about 15 μm to 85 μm. The second active filler has a particle size range of from greater than 85 μm to about 120 μm and, preferably, from greater than 85 μm to about 110 μm.

Typical active fillers in rubber concretes of the invention include but are not limited to carbon black, silica, titanium dioxide, bismuth oxide, fly ash, and mixtures thereof. As is well known to those in the art, fly ash comprises silica as a major component. Fly ash with a specific surface area ($S_{ss}$) of about 200 m²/kg has been found to be particularly useful. Specific surface area is measured by the BET method. This method and other specific surface area measurement methods well known to the filler art are described in U.S. Pat. No. 5,580,919.

Typically, from about 25 wt. % to about 60 wt. % of the active filler is present as the first active filler and from about 75 wt. % to about 40 wt. % is present as the second active filler. Preferably, from about 30 wt. % to about 50 wt. % of the active filler is present as the first active filler and from about 70 wt. % to about 50 wt. % is present as the second active filler.

Generally, in a rubber concrete formulation comprising LEM, from about 6 parts to about 15 parts by weight of the first active filler is present per 100 parts by weight of low molecular weight rubber. Additionally, from about 10 parts to about 30 parts by weight of the second active filler is present per 100 parts by weight of low molecular weight rubber and, preferably, from about 10 parts to about 20 parts by weight.

Additionally, for the preparation of a concrete-type conglomerate composition, various size aggregates are combined with the rubber binder to form a rubber concrete mixture. Such mixtures can be formed by methods which are well known to those of ordinary skill in the concrete art, e.g., with commercial concrete mixing apparatus. At least one aggregate, i.e., an inorganic or organic filler that is not an active filler, is added to the rubber binder to form rubber concrete. For the purposes of this application, aggregates are divided into fine aggregate, those aggregates with a particle size up to and including 5 mm, and coarse aggregate, those aggregates with a particle size greater than 5 mm.

At least one aggregate present in the rubber concrete must be a fine aggregate. Such fine aggregates include but are not limited to quartz sand with a $S_{ss}$ of from about 100 to about 400 m²/kg. Without limitation to any particular theory, incorporation of the fine aggregate into the rubber concrete is believed to decrease internal stress, creep and shrinkage of the rubber composition. Sand with a particle size range of from about 0.14 mm up to and including 5 mm has been found to be particularly effective as the fine aggregate.

Gravel and a wide variety of mineral chips with grain sizes ranging from greater than 5 mm to about 70 mm have been found to be particularly effective as the coarse aggregate.

Generally, in a rubber concrete formulation comprising LEM, from about 65 parts to about 88 parts by weight of aggregate is present per 100 parts by weight of low molecular weight rubber. Preferably, from about 70 parts to about 83 parts by weight of aggregate is present per 100 parts by weight of low molecular weight rubber.

Rubber binders and rubber concrete containing a fine aggregate, that is, filled rubber compositions, are characterized as heterogeneously dispersed systems with Theological behavior determined by their formulation and structure. Viscosity is believed to be the most important characteristic of such filled compositions. Without limitation to any particular theory, an optimal parameter of a rubber binder and such compositions comprising it is the viscosity dependence upon the concentration of the filler particles present in the composition.

A number of factors contribute to the viscosity dependence, including: (1) viscosity for the slipping of particles over liquid phase interlayers, (2) dry friction when particles contact one another, (3) capillary attraction in the menisci formation, (4) interparticle interaction, and (5) hydrodynamics under particle deformation in the liquid. The relative contribution of some or all of these factors predetermines the viscosity of the heterogeneously-dispersed system and its rheological behavior.

Three zones in the relationship between dynamic viscosity and the volume of filler may be identified. In the first zone, characterized by a 'floating' structure in which filler particles are widely separated, rheological behavior is determined essentially by the liquid phase viscosity. Viscosity increases moderately with an increase in filler particle concentration. This is thought to arise from a lack of disperse phase quantity for structuring of the system.

As the filler content continues to increase, the second zone is entered. In this zone, the viscosity increases more intensively with increasing filler content than in the first zone since filler particles make a major contribution to the rheological state of system. Aggregate structures are generated from particles separated by thin liquid films. A composite space structure is thought to form in the second zone in response to the merging of primary aggregates.

In the third zone, a further increase in filler concentration causes an even more drastic rise in viscosity per unit increase in filler concentration than in the second zone. As this takes place, the system's 'sensitivity' to the variation in the quantity of dispersed phase is increased. On further filler concentration increase, a deficiency of liquid phase results in breaks in the film structure of the matrix and in the formation of pores.

Furthermore, with increased specific surface area at a particular volume concentration, the viscosity increases. At all specific surface areas and with a rise in filler content, viscosity increases steeply.

After it is shaped and/or molded, the rubber concrete is vulcanized at a temperature of from about 110° C. to about 150° C., preferably from about 120° C. to about 125° C., for from about 6 hours to about 20 hours, preferably from about 8 hours to about 12 hours, by using only dry hot air at a pressure not more than about 4.5 atm, preferably from about 0.5 atm to about 3.7 atm. The heating-up to the vulcanization temperature and cooling-down from the vulcanization temperature should be conducted at a rate of not more than about 1° C. per minute. If the rate is greater than about 1° C. per minute the rubber concrete may develop undesirable defects.

A distinguishing characteristic of filled rubber compositions, such as a rubber binder or rubber concrete comprising LEM, is the extreme change of their strength with an increase of filler volume and surface area. Therefore, optimizing the filler content is recommended to achieve maximum strength. For example, a series of samples 40×40×160 mm may be prepared to study the quantity, specific surface area and filler-type influence on the rubber binder strength. Without limitation to any particular theory, it is believed that for every value of filler specific surface area, there is an optimal particle concentration and strength level. For example, for quartz filler, maximum strength of the rubber binder may be achieved at a specific surface area of about 300 m²/kg and a filler concentration of about 30%.

It should be noted that as the particle size dispersity increases (at a constant filler concentration) the binder strength decreases. Without limitation to any particular theory, it is believed that this strength decrease is due to deterioration by wetting conditions of particles and, as a result, the particles aggregate into larger size capsules which reduce the binder's strength.

Chemical resistance is a critical criterion if LEM compositions and coatings and rubber concretes comprising LEM are to be used successfully as structural materials in aggressive media. Therefore, it is important to make an assessment of the vulnerability of these materials to chemical attack.

The criterion for chemical resistance is a strength test after immersion in a chemical solution. Samples are immersed in aggressive media for certain periods of time and thereafter tested under tensile or compressive loads. In addition, control samples which are not immersed in the aggressive chemical media are also tested. The coefficient of chemical resistance $K_{CR}$ is defined as:

$$K_{CR} = \sigma_\tau / \sigma_v \qquad (1)$$

where $\sigma_\tau$ and $\sigma_v$ are, respectively, the strength of a sample exposed in an aggressive medium for a time $\tau$ days and an unexposed control.

EXAMPLES

The following examples of liquid ebonite mixtures and also coatings and rubber concretes formed therefrom in accordance with the present invention are given to illustrate the present invention. However, it is to be understood that the examples are for illustrative purposes only and in no manner is the present invention limited to the specific disclosures therein.

Example 1

Preparing Liquid Ebonite Compositions

Eleven sample compositions of the invention were prepared by the following method. The components formulated into each sample and the amounts used are shown in Table 1.

Isobutylene-isoprene rubber, in the form of small size chunks (5–8 mm) and swollen by n-heptane, was dissolved in the linear or copolymer polybutadiene liquid rubber for 2–3 hours at 20–35° C. This rubber solution was mixed with sulfur, present in a pulverulent form (particle size 25–65 $\mu$m), in a mixer suitable for use with low viscosity liquids at a rotation speed of 35 rpm for 30 minutes at 20° C. After such mixing, the other components, i.e., filler(s) and accelerators, were added and the batch was mixed an additional 20 minutes at 20° C. The particle size of each filler or accelerator ranged between 20–50 $\mu$m with smaller and larger size particles being removed by sieving. This was followed by grinding in a paint rolling grinder for 20 minutes at 20° C.

TABLE 1

Compositions (in parts by weight based on 100 parts liquid rubber)

| | Composition No. | | | | | | | | | | |
|---|---|---|---|---|---|---|---|---|---|---|---|
| | 1 | 2 | 3 | 4 | 5 | 6 | 7 | 8 | 9 | 10 | 11 |
| Linear polybutadiene - SKDNN 25 (Efremov-Kautschuk GmbH) (82% cis-1,4, 25,000 mol. wt.) | 100 | 100 | — | — | — | — | — | — | — | — | — |
| Linear polybutadiene - SKDNN 30 (Efremov-Kautschuk GmbH) (87% cis-1,4, 30,000 mol. wt.) | — | — | 100 | 100 | — | — | — | — | — | — | — |
| Linear polybutadiene - SKDNN 35 (Efremov-Kautschuk GmbH) (92% cis-1,4, 20,000 mol. wt.) | — | — | — | — | 100 | 100 | — | — | — | — | — |
| Linear polybutadiene - POLYOIL ® 110 (Creanova/Hüls) (75% cis-1,4, 2,000 mol. wt.) | — | — | — | — | — | — | 100 | — | — | — | — |
| Linear polybutadiene - POLYOIL ® 130 (Creanova/Hüls) (78% cis-1,4, 5,000 mol. wt.) | — | — | — | — | — | — | — | 100 | — | — | — |
| Copoly(butadiene/pentadiene) - SKDPN 8 (Yaroslav SRP) (73 wt %/27 wt % respectively, 8,000 mol. wt.) | — | — | — | — | — | — | — | — | 100 | — | — |
| Copoly(butadiene/pentadiene) - SKDPN 12 (Yaroslav SRP) (65 wt %/35 wt % respectively, 12,000 mol. wt.) | — | — | — | — | — | — | — | — | — | 100 | — |
| Copoly(butadiene/pentadiene) - SKDPN 14 (Yaroslav SRP) (55 wt %/45 wt % respectively, 14,500 mol. wt.) | — | — | — | — | — | — | — | — | — | — | 100 |
| Isobutylene-isoprene rubber - BK (Lab. N 34/75) (Efremov SKP, Central Laboratory) (75,000 mol. wt.) | 0.7 | 0.9 | 0.6 | 0.8 | — | — | — | — | — | 0.7 | — |
| Isobutylene-isoprene rubber - BK 1675N (Kautschuk-Gesellshaft GmbH) (180,000 mol. wt.) | — | — | — | — | 0.7 | 0.9 | — | — | 1.2 | — | 1.0 |
| Isobutylene-isoprene rubber - BK (Lab. N 41/450) | — | — | — | — | — | — | 2.2 | 2.8 | — | — | — |

TABLE 1-continued

Compositions (in parts by weight based on 100 parts liquid rubber)

| | Composition No. | | | | | | | | | | |
|---|---|---|---|---|---|---|---|---|---|---|---|
| | 1 | 2 | 3 | 4 | 5 | 6 | 7 | 8 | 9 | 10 | 11 |
| (Efremov SKP, Central Laboratory) (450,000 mol. wt.) | | | | | | | | | | | |
| Sulfur - Code 104 Rubbermaker's (Harwick Chem. Corp.) | 31 | 30 | 30 | 28 | 32 | 33 | 39 | 38 | 33 | 32 | 30 |
| Active filler: | | | | | | | | | | | |
| Technical carbon black - FURNEX N-754 (Columbian Chemicals) | 21 | 20 | 21 | 20 | — | — | 18 | 18 | 20 | 21 | 20 |
| Silica white - SILENE 732D (PPG Industries) | — | — | — | — | 7 | 9 | — | — | — | — | — |
| Titanium dioxide - UNITANE (Kemira AY) | — | — | — | — | 11 | 10 | — | — | — | — | — |
| Accelerator: | | | | | | | | | | | |
| THIURAM ME (Arrow Polychem, Inc.) | — | — | — | — | — | — | 4.5 | 4.2 | 4.7 | — | — |
| CAPTAX (R.T. Vanderbilt Co.) | 2.0 | 1.8 | 2.2 | — | — | — | 0.2 | 0.3 | 0.1 | 2.0 | 2.1 |
| Diphenylguanidine - DPG Vulcanization Accelerator (Monsanto) | 2.0 | 2.2 | 1.8 | — | — | — | — | — | — | 2.0 | 1.9 |
| p-Quinonedioxime - PHDO (Tambov Chemical Plant) | — | — | — | 4.0 | 5.0 | 4.5 | — | — | — | — | — |
| Manganese Dioxide - MO Brand (St. Petersburg Plant "Krasnyi Chimik") | — | — | — | 16.0 | 15.0 | 15.5 | — | — | — | — | — |

Additionally, certain control samples were also prepared by the above method. Composition 1C is identical to Composition 1 except that liquid linear polybutadiene with 43.5% cis-1,4 content was used as the liquid rubber. Composition 2C is identical to Composition 1 except that liquid linear polybutadiene with 93.5% cis-1,4 content was used as the liquid rubber.

Composition 3C is identical to Composition 9 except that copoly(butadiene/pentadiene) with a pentadiene content of 25 wt. % was used as the liquid rubber. Composition 4C is identical to Composition 9 except that copoly(butadiene/pentadiene) with a pentadiene content of 47.5 wt. % was used as the liquid rubber.

Composition 5C is identical to Composition 4 except that sulfur with a particle size of 2–4 μm was used. Composition 6C is identical to Composition 4 except that sulfur with a particle size of 90–100 μm was used. Composition 7C is identical to Composition 4 except that carbon black with a particle size of 1.5–3.5 μm was used. Composition 8C is identical to Composition 4 except that carbon black with a particle size of 88–97 μm was used. Composition 9C is identical to Composition 4 except that both vulcanization accelerators had a particle size of 2–4 μm. Composition 10C is identical to Composition 4 except that both vulcanization accelerators had a particle size of 90–100 μm.

Composition 11C is identical to Composition 2 except that 51 parts by weight of sulfur was used. Composition 12C is identical to Composition 2 except that 24 parts by weight of sulfur was used.

Example 2

Preparing Liquid Ebonite Coatings

Liquid ebonite compositions 1–11, prepared according the method described in Example 1, were used to coat a cleaned steel plate. Each composition formed a coating layer with a thickness of 0.7–1.2 mm. Then, the coating was vulcanized at a temperature of 125° C. for 15 hours by using only dry hot air at a pressure of 3.5 atm. The heating-up to the vulcanization temperature and cooling-down from the vulcanization temperature were conducted at a rate of not more than 1° C. per minute. These coated steel samples were used to determine the tensile adhesion of each coating to the steel substrate according to the method prescribed by ASTM D 897-95.

For the purposes of tensile testing, the above procedure was modified by substituting a polytetrafluoroethylene (PTFE) sheet for the steel so that a free film of each of the 11 liquid ebonite compositions could be obtained by peeling the PTFE from the vulcanized film. The tensile properties, i.e., tensile strength and elongation at break, of each free vulcanized film were determined according to the method prescribed by ASTM D 638-84. Such samples were also used to determine and the coefficient of chemical resistance of each coating by the procedure discussed above in which the tensile strength was used to determine $K_{CR}$.

The properties of the eleven coatings of the invention, samples 12–22, are shown in Table 2.

The properties of twelve control coatings, samples 23–34, also formed by the above-described method are shown in Table 3.

TABLE 2

Properties of Vulcanized Liquid Ebonite Coatings

| | Sample No. | | | | | | | | | | |
|---|---|---|---|---|---|---|---|---|---|---|---|
| | 12 | 13 | 14 | 15 | 16 | 17 | 18 | 19 | 20 | 21 | 22 |
| Composition No. | 1 | 2 | 3 | 4 | 5 | 6 | 7 | 8 | 9 | 10 | 11 |
| Tensile Strength, MPa | 25.7 | 25.4 | 25.4 | 25.7 | 25.8 | 30.1 | 30.0 | 28.2 | 27.9 | 26.8 | 27.7 |
| Elongation at Break, % | 5.9 | 6.1 | 5.7 | 6.2 | 5.6 | 5.8 | 6.8 | 7.1 | 6.6 | 6.3 | 6.4 |
| Adhesion Strength, MPa | 11.5 | 11.3 | 11.8 | 10.7 | 10.5 | 10.4 | 10.2 | 10.0 | 12.8 | 13.1 | 12.7 |
| $K_{CR}$ after 360 days at 60° C. in: | | | | | | | | | | | |
| 35% Aqueous Hydrochloric Acid | 0.86 | 0.88 | 0.88 | 0.87 | 0.90 | 0.87 | 0.87 | 0.89 | 0.90 | 0.85 | 0.88 |
| 50% Aqueous Sulfuric Acid | 0.94 | 0.93 | 0.94 | 0.96 | 0.92 | 0.97 | 0.97 | 0.98 | 0.93 | 0.97 | 0.94 |
| 35% Aqueous Phosphoric Acid | 0.91 | 0.91 | 0.92 | 0.94 | 0.90 | 0.93 | 0.96 | 0.95 | 0.93 | 0.93 | 0.95 |

TABLE 3

Properties of Vulcanized Control Coatings

| | Sample No. | | | | | | | | | | | |
|---|---|---|---|---|---|---|---|---|---|---|---|---|
| | 23 | 24 | 25 | 26 | 27 | 28 | 29 | 30 | 31 | 32 | 33 | 34 |
| Composition No. | 1C | 2C | 3C | 4C | 5C | 6C | 7C | 8C | 9C | 10C | 11C | 12C |
| Tensile Strength, MPa | 21.3 | 21.8 | 22.0 | 21.8 | 22.7 | 21.4 | 19.7 | 23.3 | 20.7 | 20.1 | 20.8 | 25.4 |
| Elongation at Break, % | 3.8 | 2.9 | 4.2 | 4.4 | 5.6 | 5.3 | 5.1 | 5.2 | 4.3 | 5.2 | 6.2 | 4.0 |
| Adhesion Strength, MPa | 9.4 | 8.7 | 9.3 | 9.2 | 9.1 | 9.0 | 9.0 | 9.3 | 8.7 | 8.8 | 10.1 | 7.7 |

Example 3

Preparing Nitric Acid Resistant Coatings

Nitric acid resistant coating compositions were prepared by using composition 8 from Table 1, except that, as the active filler, a portion of the carbon black shown in Table 1 was replaced with powdered bismuth oxide with a mean particle diameter of 20–40 μm in the amounts as shown in Table 4. The bismuth oxide was obtained from Merck GmbH. Each coating was formed by airless spraying one of these compositions onto a carbon steel plate, which had previously been cleaned and degreased (i.e., freed from fats and oils), such that the thickness of the coating layer after vulcanization was 100 μm. Vulcanization of these coatings, sample nos. 36–39, was carried out under the same conditions as described in Example 2 for sample 19 (composition 8). Additional rod-shaped test samples were prepared by dip-coating cleaned and degreased carbon steel rods. The following properties were obtained:

TABLE 4

Efficacy of Liquid Ebonite Coatings for Protecting Steel from a 10% Aqueous Nitric Acid Solution as Determined by the Coefficient of Chemical Resistance and by the Quantity of Iron Ions in Solution[a]

| | Sample No. | | | | |
|---|---|---|---|---|---|
| | 19 | 36 | 37 | 38 | 39 |
| Bismuth Oxide Content in Coating, parts per 100 parts by weight of Liquid Ebonite | 0 | 2 | 5 | 7 | 10 |
| Technical carbon black (FURNEX N-754) Content in Coating, parts per 100 parts by weight of Liquid Ebonite | 18 | 16 | 13 | 11 | 8 |
| Exposure time at 20° C. | | | | | |
| 250 hr | 450 | 180 | 300 | 100 | 270 |
| 400 hr | 790 | 460 | 690 | 250 | 550 |
| 650 hr | 2600 | 560 | 750 | 250 | 1050 |
| $K_{CR}$ (from tensile strength) after 360 days at 60° C. in 10% aqueous $HNO_3$ | 0.47 | 0.61 | 0.79 | 0.98 | 0.76 |

[a]Combined Coulombic charge of $Fe^{II}$ and $Fe^{III}$

Additional physical property evaluations were carried out for sample no. 38; the following properties were obtained:

| | |
|---|---|
| Tensile strength, MPa | 28.0 |
| Elongation at break, % | 7.0 |
| Adhesion strength to steel, MPa | 10.3 |

Example 4

Rubber Concretes and Their Preparation

Rubber concrete mixtures were prepared as follows. Composition 7 from Table 1 was used as the matrix for such concretes except that 7.5 parts by weight zinc oxide based on 100 parts liquid rubber was present as a pigment and the active filler shown in Table 1 was replaced by 18 parts by weight fly ash based on 100 parts liquid rubber. The zinc oxide, GOST 10262-73 by the Russian standard and obtained from LNPO Pigment (Saint Petersburg, Russia), had a particle size of 5–60 $\mu$m. The fly ash was obtained from the Nesher company (Nesher, Israel) and had a particle size of 60–110 $\mu$m distributed as follows: 8 parts (44.4%) 60–85 $\mu$m and 10 parts (55.6%) >85–110 $\mu$m. Before the fly ash was added to the composition, it was pre-treated by mixing it with a portion of the liquid rubber (10% of the total in the composition) in a ball mill for 25 minutes at 40° C.

Rubber concrete mixtures were prepared from the above matrix by adding typical aggregate materials used in the formation of concretes. Here, quartz sand with a particle size of from about 0.2 mm to about 3 mm and granite rubble with a particle size of about 7 mm were used in the following amounts (in parts by weight):

| | 40 | 41 |
|---|---|---|
| LEM rubber binder (Composition 7 in Table 1 modified as discussed above) | 100 | 100 |
| Aggregate: | | |
| quartz sand (fine) | 135 | 135 |
| granite rubble (coarse) | 690 | 655 |

The rubber binder and aggregate were combined to form a rubber concrete by mixing the above components in a low speed concrete mixer for 30 minutes at 25° C.

All of the rubber concrete sample parts were shaped by pouring the concrete mixtures into a form and using a conventional vibration table for 10–15 minutes at 20–25° C. After forming, the concrete parts underwent thermal treatment, i.e., vulcanization, as described in Example 2 for preparing a liquid ebonite coating from sample 18 (composition 7).

The compressive strength of rubber concrete samples was determined according to the method prescribed by ASTM C1013-89. The bending strength was determined according to the method prescribed by DIN 5345-53. The tensile properties were determined according to the method prescribed by ASTM D 638-84. Abrasion resistance was determined with a Tabor Abrader according to the method prescribed by ASTM D 4060-90. Water absorption was determined according to the method prescribed by ASTM D 570. $K_{CR}$ was determined as described above from the compressive strength of the samples. The main properties of the hardened rubber concrete samples are as follows:

| | 40 | 41 |
|---|---|---|
| Compression strength, MPa | 98.6 | 99.8 |
| Bending Strength, MPa | 33.2 | 33.0 |
| Tensile Strength, MPa | 21.4 | 21.2 |
| Young's Modulus, MPa × 10$^4$ | 2.1 | 2.0 |
| Poisson's Ratio | 0.26 | 0.26 |
| Resistance to Abrasion, kg/m$^2$ × 10$^{-3}$ | 1.8 | 1.7 |
| Water Absorption, wt. % over 24 hours | 0.05 | 0.04 |
| $K_{CR}$ after 360 days at 20° C. in: | | |
| 20% Aqueous Sulfuric Acid | 1.02 | 1.04 |
| 10% Aqueous Lactic Acid | 0.99 | 0.98 |
| 20% Aqueous NaOH | 1.03 | 1.01 |

While it is apparent that the illustrative embodiments of the invention herein disclosed fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

The contents of all patents cited herein are incorporated by reference in their entirety.

What is claimed is:

1. A liquid solventless synthetic rubber-based composition comprising:
    (a) a low number average molecular weight rubber selected from the group consisting of polybutadiene comprising from about 75% to about 92% cis-1,4 units, a copolymer comprising butadiene units and from about 27 wt % to about 45 wt % pentadiene units, and mixtures thereof,
    (b) a high number average molecular weight rubber comprising isobutylene units and not more than about 6 wt % isoprene units, said high number average molecular weight rubber being present in an amount of from about 0.5 parts to about 4 parts by weight based on the weight of low number average molecular weight rubber,
    (c) sulfur,
    (d) a vulcanization accelerator, and
    (e) an active filler
wherein the sulfur, the accelerator, and the active filler are each present in the form of a powder with a particle size of from about 5 $\mu$m to about 85 $\mu$m.

2. The composition of claim 1, wherein the number average molecular weight of the low number average molecular weight rubber is from about 2,000 to about 30,000 g/mol.

3. The composition of claim 1, wherein the low number average molecular weight rubber has a Brookfield viscosity of from about 0.7 Pa.s to about 300 Pa.s at 20° C.

4. The composition of claim 1, wherein the number average molecular weight of the high number average molecular weight rubber is at least about 50,000 g/mol.

5. The composition of claim 4, wherein the number average molecular weight of the high number average molecular weight rubber is from about 75,000 to about 450,000 g/mol.

6. The composition of claim 1, wherein the high number average molecular weight rubber comprises a substantially linear polymer chain.

7. The composition of claim 1, wherein the high number average molecular weight rubber has a Mooney viscosity of from about 35 to about 55 at 125° C.

8. The composition of claim 1, wherein the high number average molecular weight rubber is present in an amount of from about 0.6 parts to about 2.8 parts by weight based on the weight of low number average molecular weight rubber.

9. The composition of claim 1, wherein from about 20 parts to about 50 parts by weight of sulfur is present per 100 parts by weight of low number average molecular weight rubber.

10. The composition of claim 9, wherein from about 27 to about 35 parts by weight of sulfur is present per 100 parts by weight of low number average molecular weight rubber.

11. The composition of claim 1, wherein from about 2.5 parts to about 30 parts by weight of the accelerator is present per 100 parts by weight of low number average molecular weight rubber.

12. The composition of claim 11, wherein from about 3.5 parts to about 22 parts by weight of accelerator is present per 100 parts by weight of low number average molecular weight rubber.

13. The composition of claim 1, wherein the accelerator is at least one material selected from the group consisting of aldehyde amines, guanidines, thiazoles, sulfenamides, dithiocarbamates, thiuram sulfides, xanthates, and morpholine disulfides.

14. The composition of claim 1, wherein the accelerator is at least one material selected from the group consisting of hexamethylene tetraamine, ethylidene aniline, diphenyl guanidine, triphenyl guanidine, di-o-tolylguanidine, mercaptobenzthiazole and the sodium salt of mercaptobenzthiazole, dibenzthiazyl disulfide, N-cyclohexylbenzthiazylsulfenamide, N-oxydiethylbenzthiazylsulfenamide, piperidine pentamethylenedithiocarbamate, zinc diethyldithiocarbamate, sodium diethyldithiocarbamate, zinc ethylphenyldithiocarbamate, tetramethylthiuram disulfide, tetraethylthiuram disulfide, tetramethylthiuram monosulfide, dipentamethylenethiuram tetrasulfide, zinc isopropyl xanthate, sodium isopropyl xanthate, zinc butyl xanthate, and bis-morpholine disulfide.

15. The composition of claim 1, wherein the accelerator is at least one material selected from the group consisting of 2-mercaptobenzothiazole, zinc 2-mercaptobenzothiazolate, zinc dimethyldithiocarbamate, zinc dimethylthiocarbamate, N,N-dimethylcyclohexylammonium dibutyldithiocarbamate, tetramethylthiuram disulfide, tetraethylthiuram disulfide, tetrabutylthiuram disulfide, benzothiazyl disulfide, tetramethylthiuram monosulfide, tetracarbonyl sulfenamide, 4,4'-dithiomorpholine, 2-benzothiazyl-N-morpholine disulfide, N,N-diphenyl morpholine, diphenylguanidine, dipentamethyl thiourea, magnesium oxide, and zinc oxide.

16. The composition of claim 1, wherein from about 14 parts to about 30 parts by weight of the active filler is present per 100 parts by weight of low number average molecular weight rubber.

17. The composition of claim 16, wherein from about 18 parts to about 23 parts by weight of the active filler is present per 100 parts by weight of low number average molecular weight rubber.

18. The composition of claim 1, wherein the active filler is selected from the group consisting of carbon black, bismuth oxide, silica, titanium dioxide and mixtures thereof.

19. The composition of claim 1, wherein the active filler consists essentially of from about 6 parts to about 9 parts by weight of bismuth oxide per 100 parts by weight of low number average molecular weight rubber and from about 12 parts to about 9 parts by weight of carbon black per 100 parts by weight of low number average molecular weight rubber.

20. The composition of claim 1, wherein the sulfur, the accelerator, and the active filler are each present in the form of a powder with a particle size of from about 15 $\mu$m to about 75 $\mu$m.

21. The composition of claim 20, wherein the sulfur, the accelerator, and the active filler are each present in the form of a powder with a particle size of from about 15 $\mu$m to about 50 $\mu$m.

22. The composition of claim 1, wherein the composition further comprises at least one activator.

23. The composition of claim 22, wherein from about 0.5 parts to about 4.3 parts by weight of the activator is present per 100 parts by weight of low number average molecular weight rubber.

24. The composition of claim 1, wherein the composition further comprises at least one material selected from the group consisting of antioxidants, antiozonants, inhibitors, antiblocking agents, antiflex-cracking agents antislip agents, antistatic agents, UV light adsorbers, flame retarders, fungicides, germicides, heat sensitizers, chemical stabilizers, heat stabilizers, processing aids, peptizers, plasticizers, softeners, dispersing agents, tackifiers, pigments, dyes, micropheres, reinforcing agents, thixotropic agents, coupling agents, catalysts, and leveling agents.

25. A liquid solventless synthetic rubber-based composition comprising:
(a) a low number average molecular weight rubber selected from the group consisting of polybutadiene comprising from about 75% to about 92% cis-1,4 units, a copolymer comprising butadiene units and from about 27 wt % to about 45 wt % pentadiene units, and mixtures thereof,
(b) a high number average molecular weight rubber comprising isobutylene units and not more than about 6 wt % isoprene units, said high number average molecular weight rubber being present in an amount of from about 0.5 parts to about 4 parts by weight based on the weight of low number average molecular weight rubber,
(c) sulfur,
(d) a vulcanization accelerator, and
(e) an active filler
wherein the sulfur, the accelerator, and the active filler are each present in the form of a powder with a particle size of from about 5 $\mu$m to about 85 $\mu$m and wherein the composition is vulcanized at a vulcanization temperature of about or greater than 80° C.

26. The composition of claim 25, wherein the heating-up to the vulcanization temperature and cooling-down from the vulcanization temperature is conducted at a rate of not more than about 1° C. per minute.

27. A liquid rubber concrete composition comprising:
(a) a low number average molecular weight rubber selected from the group consisting of polybutadiene comprising from about 75% to about 92% cis-1,4 units, a copolymer comprising butadiene units and from about 27 wt % to about 45 wt % pentadiene units, and mixtures thereof,
(b) a high number average molecular weight rubber comprising isobutylene units and not more than about 6 wt % isoprene units, said high number average molecular weight rubber being present in an amount of from about 0.5 parts to about 4 parts by weight based on the weight of low number average molecular weight rubber,
(c) sulfur, (d) a vulcanization accelerator, (e) an active filler, and (f) a fine aggregate wherein the sulfur and the accelerator are each present in the form of a powder with a particle size of from about 5 μm to about 85 μm and wherein the active filler is present in the form of a powder and consists essentially of at least one first active filler with a particle size of from about 5 μm to 85 μm and at least one second active filler with a particle size of from greater than 85 μm to about 120 μm.

28. The rubber concrete composition claim 27, wherein the composition is vulcanized at a vulcanization temperature of about or greater than 110° C.

29. The rubber concrete composition of claim 28, wherein the heating-up to the vulcanization temperature and cooling-down from the vulcanization temperature is conducted at a rate of not more than about 1° C. per minute.

30. The rubber concrete composition of claim 27, wherein the at least one first active filler is present in the form of a powder with a particle size of from about 15 μm to 85 μm.

31. The rubber concrete composition of claim 27, wherein the at least one second active filler is present in the form of a powder with a particle size of from greater than 85 μm to about 110 μm.

32. The rubber concrete composition of claim 27, wherein the active filler is selected from the group consisting of carbon black, silica, titanium dioxide, bismuth oxide, fly ash, and mixtures thereof.

33. The rubber concrete composition of claim 27, wherein the first active filler is fly ash and wherein the second active filler is fly ash.

34. The rubber concrete composition of claim 27, wherein from about 6 parts to about 15 parts by weight of the at least one first active filler is present per 100 parts by weight of low number average molecular weight rubber.

35. The rubber concrete composition of claim 27, wherein from about 10 parts to about 30 parts by weight of the at least one second active filler is present per 100 parts by weight of low number average molecular weight rubber.

36. The rubber concrete composition of claim 35, wherein from about 10 parts to about 20 parts by weight of the at least one second active filler is present per 100 parts by weight of low number average molecular weight rubber.

37. The rubber concrete composition of claim 27, wherein from about 25 wt. % to about 60 wt. % of the active filler is present as the at least one first active filler and from about 75 wt. % to about 40 wt. % of the active filler is present as the at least one second active filler.

38. The rubber concrete composition of claim 27, wherein the fine aggregate consists essentially of sand with a particle size of from about 0.14 mm to and including 5 mm.

39. The rubber concrete composition of claim 27, wherein from about 65 parts to about 88 parts by weight of aggregate is present per 100 parts by weight of low number average molecular weight rubber.

40. The rubber concrete composition of claim 27, wherein the composition further comprises at least one coarse aggregate.

41. The rubber concrete composition of claim 40, wherein the coarse aggregate is selected from the group consisting of gravel and mineral chips and wherein the grain size of the coarse aggregate is from greater than 5 mm to about 70 mm.

42. The rubber concrete composition of claim 27, wherein the composition further comprises at least one activator.

* * * * *